Oct. 3, 1961  A. H. PINKE  3,002,699
COMBINED SPRAYER PUMP AND CONTAINER ASSEMBLY
Filed Feb. 19, 1960  2 Sheets-Sheet 1
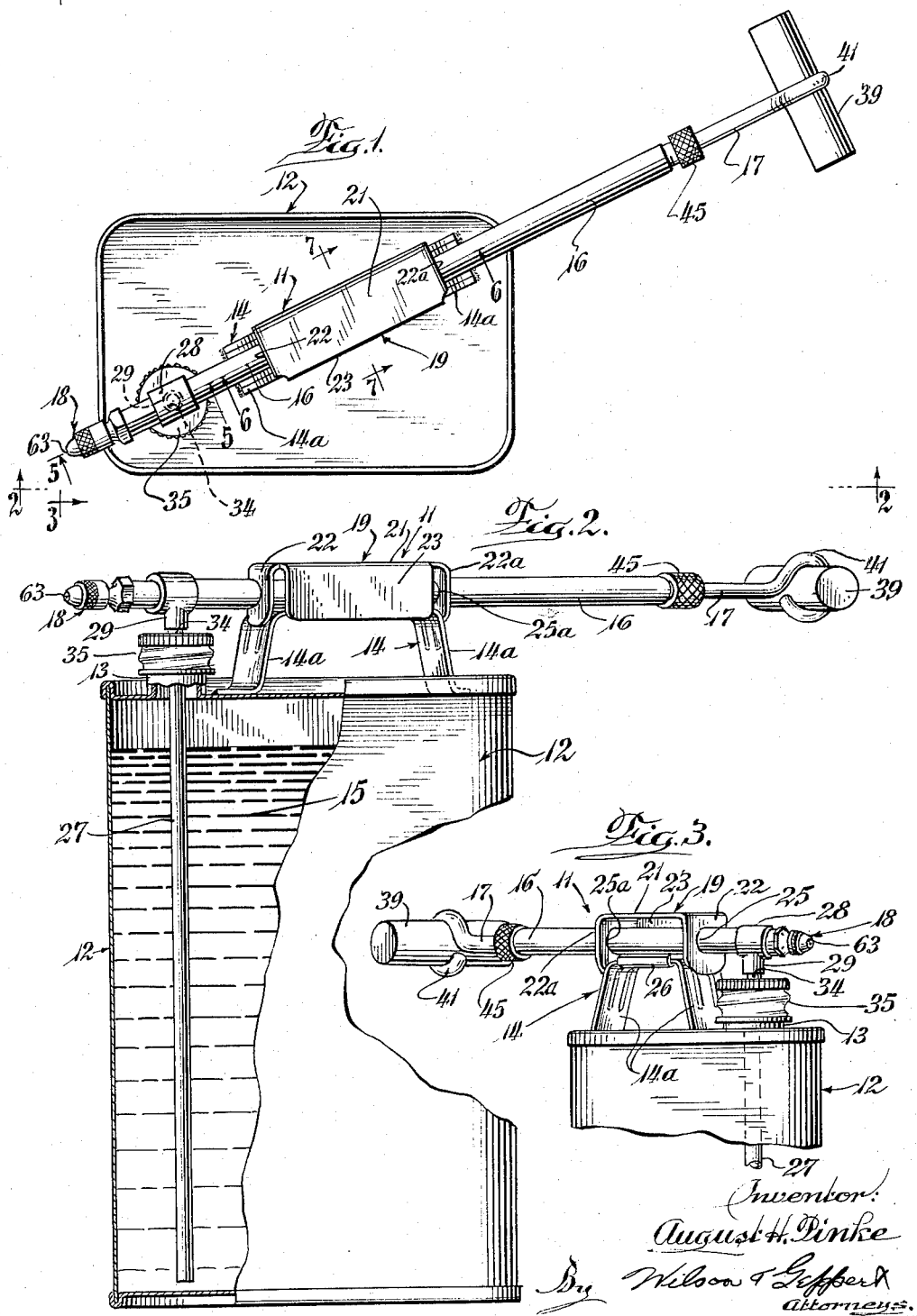

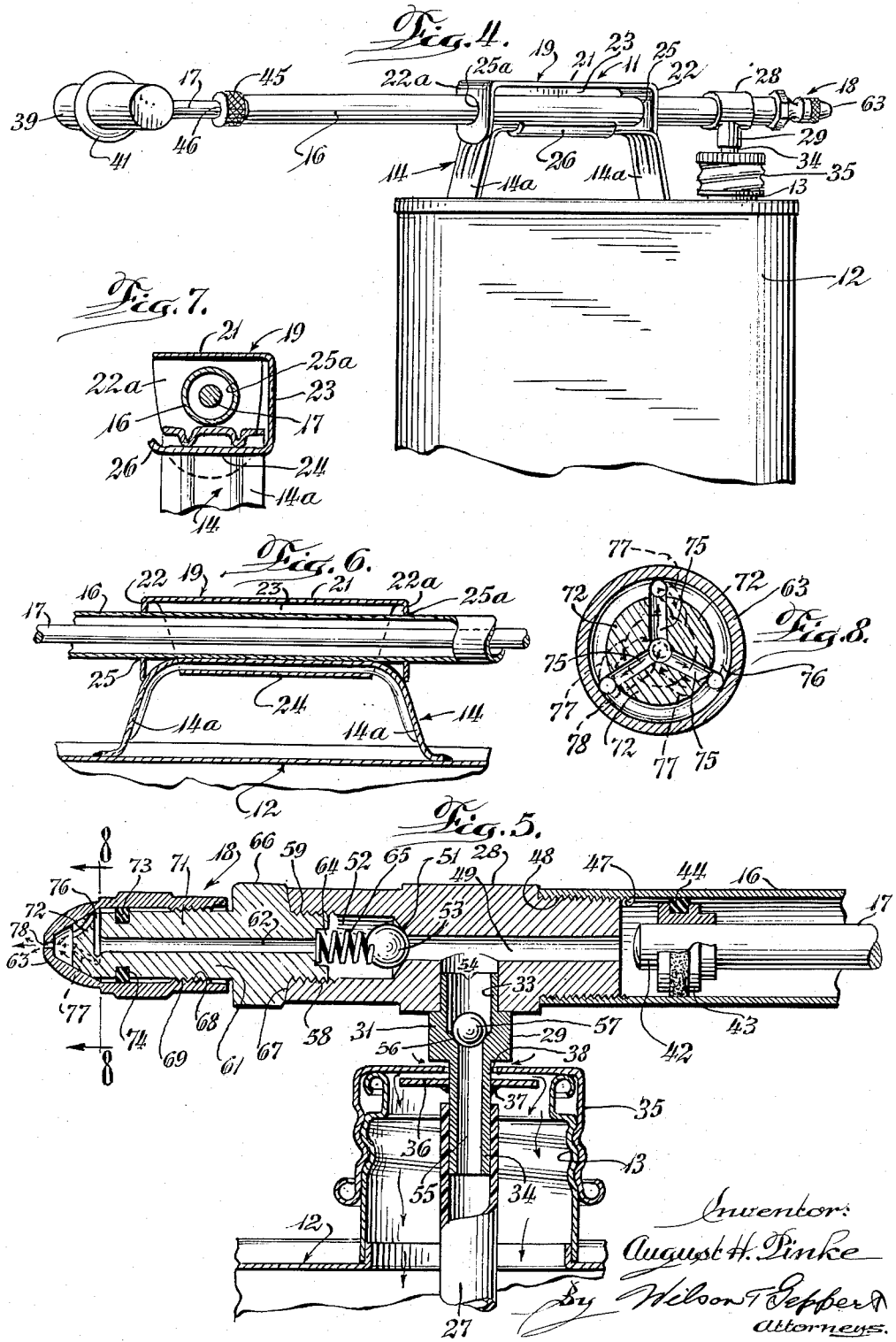

United States Patent Office 3,002,699
Patented Oct. 3, 1961

3,002,699
COMBINED SPRAYER PUMP AND
CONTAINER ASSEMBLY
August H. Pinke, Hastings, Minn., assignor to H. D. Hudson Manufacturing Company, Chicago, Ill., a corporation of Minnesota
Filed Feb. 19, 1960, Ser. No. 9,757
8 Claims. (Cl. 239—333)

The present invention relates to the art of pesticidal applicators or sprayers and more particularly to a novel combination of a hydraulic spray pump having a cap and siphon tube depending from adjacent the discharge end of the pump, a container in which the spray solution is initially supplied having a bail or handle affixed to the top thereof, and a detachable mounting on said pump for ready and convenient attachment to the handle or the container for supporting the pump upon the handle with the siphon tube extending into the container and supplying the spray solution to the pump, the handle providing a convenient means for carrying the assembly and supporting the pump while in use, and for directing the spray from said pump.

Manually-operated sprayers for dispensing insecticides, pesticides and the like of the general type to which the present invention is directed, generally comprise (1) an air pump and a receptacle affixed thereto and provided with a supply tube and a fill opening or (2) a removable receptacle of metal or glass depending from and wholly supported from a cap affixed to the discharge end of the pump and provided with a supply tube depending into the receptacle, the latter being removable for filling and use. In either form, the receptacle is supplied with a quantity of spray solution siphoned from the receptacle through the supply tube into the pump and discharged therefrom as the pump is actuated.

The present invention has for an important object the provision of a hydraulic pump having a cap for attachment to the threaded neck of the discharge opening of a container, a siphon tube depending into the container and a mounting for attachment to the bail or handle of the container, said pump, its cap and mounting and the bail or handle of the container being so constructed and arranged whereby when the closure of the container is removed, the siphon tube is inserted into the opening and the cap on the pump is attached to close the opening, and the mounting is attached to the bail or handle of the container, the pump is automatically secured in operative position upon the container in which the spray solution is supplied by the manufacturer. Furthermore, the bail or handle for carrying the container and the mounting on the pump are so disposed and related to the discharge opening of the container that mounting of the pump on the handle as above described automatically aligns the pump for most effective operation.

In this novel manner of mounting the spray pump assembly upon the original container for the spray solution, the requirement of refilling the prior type of receptacles at frequent intervals from a larger storage receptacle in which the spray solution is purchased and the frequent interruptions required for such refilling are completely avoided. Thus the present invention solves the problem of frequent refills for a hand sprayer by the utilization of a novel hydraulic spray pump assembly mounted upon the bail or handle of the original container for the spray solution as purchased, the operator being assured that the pump assembly with its siphon or delivery tube is in proper alignment with the tube inserted into the opening of the container and retained by a threaded closure on the pump assembly.

A further important object of the present invention is the provision of a novel combination of a container and a spray pump assembly for detachable mounting on the bail or handle provided on the container used in the sale of insecticides, pesticides and other spray solutions. When the container is emptied the novel spray pump assembly may be quickly removed and mounted upon another such container.

Another object of the present invention is the provision of a novel auxiliary handle on the cylinder of a hydraulic spray pump assembly which aligns the siphon or delivery tube and closure cap on the spray pump assembly with the discharge opening of the container for the spray solution. This auxiliary handle is freely adjustable on the pump cylinder and provided with a flange adapted to snap under the handle or bail secured to the top of the container with the handle on the container aligned with its discharge opening. This auxiliary handle not only locks the pump in proper and most effective position for operation, but also forms a secure hand grip for pumping and carrying the assembled pump and container.

A further object of the present invention is the provision of a compact and efficiently operating hydraulic pumping mechanism to draw the spray solution from the container and eject it in a desired spray pattern. This compact pumping mechanism is designed for easier handling and for ready storage or shipping disassembled from the container.

Further objects are to provide a construction of maximum simplicity, efficiency, economy and ease of assembly and operation, and such further objects, advantages and capabilities as will later more fully appear and are inherently possessed thereby.

In the drawings:
FIGURE 1 is a top plan view of the present invention in which the novel spray pump assembly is secured to the bail or handle of the container for the spray solution.

FIG. 2 is a fragmentary, enlarged side elevational view of the complete assembly taken on the line 2—2 of FIG. 1 and viewed in the direction of the arrows with a portion of the container broken away to show the delivery or siphon tube extending into the container.

FIG. 3 is an end elevation view taken on the line 3—3 of FIG. 1 and viewed in the direction of the arrows, the lower portion of the container and delivery tube being broken away.

FIG. 4 is a side elevational view of the spray pump assembly mounted upon the handle of the container, this view showing the side opposite that shown in FIG. 2 and further disclosing the manner in which the auxiliary handle of the pump assembly is mounted upon the handle of the container.

FIG. 5 is an enlarged vertical cross sectional view taken on line 5—5 of FIG. 1 viewed in the direction of the arrows and showing the internal structure and valve assembly of the hydraulic sprayer pump and its connection with the threaded neck of the container.

FIG. 6 is an enlarged vertical cross sectional view taken on the line 6—6 of FIG. 1 and showing the construction and manner of assembly of the auxiliary handle on the sprayer pump and the manner in which it is secured on the handle of the container.

FIG. 7 is an enlarged vertical cross sectional view taken on the line 7—7 of FIG. 1 and further showing the construction and arrangement of the auxiliary handle on the pump assembly and the manner in which it is mounted on the handle or bail of the container.

FIG. 8 is a vertical cross sectional view taken on the line 8—8 of FIG. 5 and showing a portion of the internal structure of the spray nozzle.

Referring more particularly to the disclosure in the drawings in which is shown an illustrative embodiment of the present invention with FIGS. 1 to 5, inclusive, disclosing the sprayer pump assembly 11 and the spray solution container 12 in their assembled relationship. The container or storage can 12 is of a size suitable for use by a manufacturer supplying the spray solution and from which the spray solution is directly discharged. For example, these containers may be of one gallon capacity. The container 12 is provided with a discharge opening defined by a threaded neck 13 and a carrying handle or bail 14, the opening and longitudinal axis of the handle being in alignment. Although the drawings show the opening and threaded neck 13 adjacent one corner of the can, the important feature is that the opening and the handle 14 be in alignment for proper assembly and most effective operation of the spray pump.

The hydraulic sprayer pump assembly 11 includes a pump cylinder 16, manually-actuated piston rod 17 concentrically arranged in the cylinder, a sprayer nozzle 18 and an auxiliary handle 19 which aligns the pump cylinder 16 on the container 12 and forms a carrying handle for the complete assembly including the container. The auxiliary handle 19 is formed preferably from sheet metal with a top 21, depending end tabs 22 and 22ª through which project the cylinder 16, a side portion 23 and a bottom flange 24. This auxiliary handle is contoured so that the top 21, side 23 and bottom flange 24 partially encompass the pump cylinder 16 leaving one side of the enclosure open. The end tabs 22 and 22ª are bent at right angles to the top 21 and are formed with aligned openings 25 and 25ª to receive and align the pump cylinder 16 with the container handle 14. As seen in FIG. 7, the bottom flange 24 terminates in an upturned lip 26 to guide and tensionally anchor the auxiliary handle 19 onto the handle or bail 14 of the container.

The handle 14 on the top of the container 12 has a general inverted U-shape but opening laterally and the auxiliary handle 19 is slipped laterally over the handle 14 with the bottom flange 24 guided under the top of the handle 14 with the depending end tabs 22 and 22ª disposed at the outer ends of the hand grasping portion of the handle 14 and abutting the upper ends of the spaced legs 14ª of this handle. When assembled, the auxiliary handle 19 and the container handle 14 form a rigid assembly which aligns the longitudinal axis of the pump cylinder 16 with the longitudinal axis of the handle 14. In this assembly the upturned lip 26 anchors and retains the auxiliary handle 19 from accidental disengagement from the handle 14 and container 12, but permits ready removal thereof by the operator.

The pump assembly 11 is provided with a delivery tube 27 leading to the pump through a tubular part 28 and nipple 29 to which the delivery tube is affixed. The delivery tube is inserted through the opening of the threaded neck 13 into the container 12, with the delivery tube 27 extending down to adjacent the bottom of the container 12. The nipple 29 is affixed to the tubular part 28 of the pump cylinder and provided with an enlargement 31. An upper reduced end portion 33 of the nipple 29 is threaded, press-fitted or attached by other suitable means into the tubular part 28 with the lower reduced end portion 34 projecting downwardly through a screw cap 35 and connected to the upper end of the delivery tube 27. A collar 36 is rigidly secured to the depending end portion 34 by welding, soldering or press-fitted at 37.

A central opening in the screw cap 35 provides an annular space 38 between the screw cap and the reduced end portion 34 of nipple 29 for the entrance of air into the container 12 as a pressure differential is created by operation of the hydraulic pump, thus permitting spray solution 15 to be drawn up through the delivery tube 27 into the tubular part 28 of the pump assembly.

The piston rod 17 is manually actuated by a handle 39 connected to the outer end 41 of the rod. To the inner end 42 of the piston rod 17 is secured a piston 43 having a sealing O-ring 44, preferably of a natural or compounded synthetic rubber which is resistant to the spray solution used. At the outer end of the pump cylinder 16 is provided a knurled closure or cap 45 threadedly secured to the end of the cylinder 16. This cap has a central opening 46 to accommodate and permit reciprocation of the piston rod 17.

The opposite end of the pump cylinder 16 is internally threaded at 47 for engagement with the external threads 48 on the tubular part 28. A central bore provides a passage 49 extending axially through the tubular part 28 communicating with the pressure chamber of the cylinder 16, said passage at its other end terminating in an enlarged bore having a valve seat 51 and a chamber 52 for a ball valve 53. A passage 54 at right angles to the passage 49 communicates with the bore 55 of the nipple 29 and thence with the delivery tube 27, with the bore of the nipple opening into a tapered valve seat 56 accommodating a non-return ball valve 57.

The chamber 52 is internally threaded at 58 to receive the externally threaded end 59 of the spray nozzle 18. This spray nozzle 18 consists of a nozzle body 61 having a central passage 62 therethrough and an adjustable end cap 63. An enlarged recess 64 at one end of the passage 62 forms a seat for one end of an extensible coil spring 65, the other end of which engages and yieldably urges the ball valve 53 against its valve seat 51. At the threaded end portion 59 of the nozzle 18 is an enlargement 66, one tapered side of which abuts the complementary end surface 67 of the tubular part 28. The outer end of the nozzle body 61 is threaded at 68 for threaded engagement with the internal threads 69 on the nozzle cap 63, with the extreme forward end 71 terminating in a truncated conical part 72. An O-ring 73 in an annular groove 74 provides sealing engagement between the end 71 and the encompassing end cap 63.

As seen in FIGS. 5 and 8, the central bore or passage 62 terminates in the forward end 71 of the nozzle body 61 at a point spaced from the truncated conical part 72. From this point of termination, a plurality of ports 75 radiate outwardly from the passage 62 to the annular space 76 between the nozzle cap 63 and the truncated conical end 72 with the spray solution issuing through communicating slots 77 spirally arranged with respect to the longitudinal axis. An opening 78 at the forward end of the adjustable cap 63 provides an outlet for the spray solution.

Having fully described the construction of the novel sprayer assembly, an operational cycle of the pump will be described. The spray pump assembly 11 is attached to the spray solution container 12 by removing the cap on the threaded neck 13 of the container, inserting the delivery tube 27, slipping the auxiliary handle 19 over the container handle or bail 14, and securing the screw cap 35 onto the threaded neck 13. Then the assembly is ready for operation. The opening 46 in the knurled cap 45 through which extends the piston rod 17 allows air to enter or exit from the pump cylinder 16 behind the piston 43 so that a pressure differential or vacuum is not created in that space. When the piston 43 is withdrawn from the tubular part 28 on the suction stroke, a vacuum is created in passage 49 since no air can leak around the sealing O-ring 44. As air at atmospheric pressure can enter the container 12, the differential in pressure between the interior of the container 12 and the passage 49 results in spray solution being drawn up through the delivery tube 27, past the non-return valve 57 and through passage 54 into the passage 49 and the pump cylinder. During this suction stroke, the resilient spring 65 urges the ball valve 53 against the valve seat 51 thus preventing the escape of spray solution and the entrance of air into the passage 49 from nozzle 18.

When the movement of the piston 43 is reversed on the compression stroke, pressure is exerted on the entrapped spray solution in passage 49 and the cylinder 16 which urges the non-return valve 57 to closed position against its valve seat 56. Simultaneously, the ball valve 53 is forced off its seat 51 against the coil spring 65 to allow the spray solution 15 to pass through the chamber 52 and into the passage 62. The spray solution under pressure is forced through the passage 62, the radial ports 75 and into the annular passage 76 from where it passes through the spiral slots 77 and exits through the nozzle outlet 78 to issue in a desired spray pattern. To control the spray pattern issuing from the nozzle 18, the end cap 63 may be adjusted by tightening or loosening the same relative to the nozzle body 61. When the cap is tightened, a swirling fine spray pattern is effected and when the cap is unscrewed, a coarse stream and larger particles of the spray solution results.

Thus it can be seen that I have invented a novel combined hydraulic sprayer pump and container assembly in which the pump assembly is mounted on the original container for the spray solution. Although I have disclosed but one illustrative embodiment of my invention, I do not wish to be limited to this embodiment but claim all equivalents comprehended by the disclosure and claims.

Having thus disclosed the invention, I claim:

1. In combination, a container for spray solution having a top provided with a fixed carrying handle and a neck defining a discharge port in spaced relation but aligned with said handle, a manually-operated hydraulic spray pump mounted and supported in operative position upon and parallel to said handle, a delivery tube suspended from adjacent one end of said pump for insertion into said port, a cap loosely encompassing said delivery tube and providing a cover for said port when the delivery tube is inserted and depends into the spray solution of the container, and an auxiliary handle loosely mounted on and carried by said pump detachably mounting said pump upon said carrying handle in operative alignment with said discharge port and maintaining the pump and nozzle in position for spraying.

2. A combined sprayer pump and container assembly, comprising a manually-operated hydraulic pump having a cylinder, a reciprocal piston in said cylinder and a nozzle for discharge of a spray solution, a delivery tube depending from said pump adjacent the nozzle, a container for the spray solution having a fixed carrying handle and a port in spaced axial alignment with said handle and into which port depends the delivery tube, said carrying handle including a horizontal gripping portion and depending legs secured to the top of the container, and an auxiliary handle loosely mounted on said pump cylinder for securing the pump upon and in alignment with said horizontal portion of said carrying handle and in operative spraying position.

3. A combined sprayer pump and container assembly as set forth in claim 2, in which the container is provided with a threaded neck defining the port, and a screw cap is carried by and loosely encompasses said delivery tube and is screwed onto the threaded neck when the delivery tube is inserted and depends into the spray solution to be withdrawn from the container by operation of the pump.

4. A combined sprayer pump and container assembly as set forth in claim 3, in which said delivery tube is provided with means to retain said screw cap on said tube.

5. A combined sprayer pump and container assembly as set forth in claim 2, in which said auxiliary handle has end tabs with aligned openings slidably receiving said pump cylinder, a top plate connecting said end tabs, a side panel and a bottom flange, said auxiliary handle substantially encompassing the horizontal portion of said carrying handle with the bottom flange located under said horizontal portion to detachably lock said auxiliary handle and associated pump onto the carrying handle of the container for operating the pump and directing the spray solution, and whereby the container and pump assembly are securely connected and carried about by grasping the auxiliary handle.

6. A manually-operated hydraulic sprayer pump assembly for detachable mounting upon the carrying handle of a container for spray solution, comprising a cylinder, a reciprocating piston in said cylinder, a nozzle for discharge of the spray solution, a delivery tube depending from said pump for withdrawing spray solution from the container into the cylinder of the pump upon the suction stroke of the piston, said entrapped spray solution being discharged from the cylinder through the nozzle upon the compression stroke of the piston, a non-return valve controlling flow of spray solution from said delivery tube into the pump cylinder, a second non-return valve ahead of the junction of the delivery tube and the pump cylinder controlling flow from the pump cylinder to the nozzle, and clamping means on said pump cylinder for engaging and securely mounting and retaining the pump for operation upon and in alignment with the carrying handle of the container, said clamping means comprising an auxiliary handle slidable axially on and partially encompassing said pump cylinder, said handle including end tabs having openings receiving the pump cylinder, a top plate connecting said end tabs, a side panel and a bottom flange adapted to project under and lock onto said carrying handle.

7. A manually-operated hydraulic sprayer pump assembly as set forth in claim 6, in which the bottom flange terminates in a curved lip for guiding the auxiliary handle into locking engagement with the carrying handle of the container.

8. A manually-operated hydraulic sprayer pump as set forth in claim 6, in which said nozzle includes a plurality of spiral passages leading to the nozzle opening to provide a swirling dispersion of the spray solution from the nozzle.

References Cited in the file of this patent

UNITED STATES PATENTS

| | | |
|---|---|---|
| 2,257,725 | Davis | Oct. 7, 1941 |
| 2,737,413 | Mitchison | Mar. 6, 1956 |
| 2,752,200 | Santorelli | June 26 1956 |